United States Patent
Nakagawa

(10) Patent No.: US 10,438,630 B2
(45) Date of Patent: Oct. 8, 2019

(54) DISPLAY CONTROL APPARATUS THAT PERFORMS TIME-LINE DISPLAY, METHOD OF CONTROLLING THE SAME, AND STORAGE MEDIUM

(71) Applicant: CANON KABUSHIKI KAISHA, Tokyo (JP)

(72) Inventor: Koichi Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/893,027

(22) Filed: Feb. 9, 2018

(65) Prior Publication Data
US 2018/0233174 A1  Aug. 16, 2018

(30) Foreign Application Priority Data

Feb. 10, 2017  (JP) .................................. 2017-023197
Jan. 22, 2018  (JP) .................................. 2018-008122

(51) Int. Cl.
*G11B 27/02*  (2006.01)
*G11B 27/34*  (2006.01)
*H04N 5/225*  (2006.01)
*H04N 5/232*  (2006.01)
*G06F 3/0484* (2013.01)

(52) U.S. Cl.
CPC .............. *G11B 27/02* (2013.01); *G11B 27/34* (2013.01); *G06F 3/0484* (2013.01); *H04N 5/2258* (2013.01); *H04N 5/232* (2013.01)

(58) Field of Classification Search
CPC ...... G11B 27/02; G11B 27/34; H04N 5/2258; H04N 5/232; G06F 3/0484

USPC .......................... 386/241, 224, 227; 345/619
See application file for complete search history.

(56) References Cited

U.S. PATENT DOCUMENTS

| 2009/0034806 | A1* | 2/2009 | Hayase | .................. | G06F 3/0482 |
| | | | | | 382/118 |
| 2011/0273471 | A1* | 11/2011 | Nagasaka | .......... | H04N 5/23212 |
| | | | | | 345/619 |
| 2012/0189263 | A1* | 7/2012 | Kato | .................. | H04N 5/23245 |
| | | | | | 386/227 |
| 2017/0318258 | A1* | 11/2017 | Ooishi | ..................... | G09G 3/20 |

FOREIGN PATENT DOCUMENTS

JP       2010-263374 A    11/2010

* cited by examiner

*Primary Examiner* — Thai Q Tran
*Assistant Examiner* — Syed Y Hasan
(74) *Attorney, Agent, or Firm* — Carter, DeLuca & Farrell LLP

(57) ABSTRACT

A display control apparatus capable of performing time-line display of a moving image including a section recorded at a different recording speed from the real-time recording speed, at time intervals designated by a user. Frames are extracted from a moving image at time intervals set by a user to display the extracted frames in a line. When a moving image includes a first section recorded at a recording frame rate which is the same as a reproduction frame rate, and a second section recorded at a frame rate different from the reproduction frame rate, frames are extracted from the first section at a first frame interval, and from the second section at a second frame interval different from the first frame interval. The frames extracted from the first section and the second section, respectively, are displayed in a line.

9 Claims, 16 Drawing Sheets

DISPLAY CONTROL APPARATUS THAT PERFORMS TIME-LINE DISPLAY, METHOD OF CONTROLLING THE SAME, AND STORAGE MEDIUM

BACKGROUND OF THE INVENTION

Field of the Invention

The present invention relates to a display control apparatus, a method of controlling the same, and a storage medium, and more particularly to a display control apparatus that performs time-line display when reproducing a moving image including images recorded at different recording speeds.

Description of the Related Art

As a type of reproduction apparatuses that reproduce an image or the like, a reproduction apparatus is generally known which performs so-called time-line display in which images of frames forming a moving image are extracted for display at time intervals designated by a user (see e.g. Japanese Laid-Open Patent Publication (Kokai) No. 2010-263374). Let it be assumed, for example, that a moving image recorded at a rate of 30 frames per second (hereinafter referred to as 30 FPS) is subjected to a time-line display at intervals of one second. In this case, the time-line display is performed by extracting images of frames forming the moving image every 30 frames, and displaying the extracted images, in a line, in a reduced size.

By performing the time-line display, a user can efficiently grasp what kind of images were recorded in a moving image. Further, the time-line display is also useful in searching for a target scene (image) when a user performs an editing operation, such as cutting.

On the other hand, when a moving image is shot, there is a case where scenes recorded at different recording speeds are included in one moving image. This shooting provides such an effect that a specific part of the moving image is slowly reproduced, and hence it is possible to obtain a more impressive moving image.

However, when a moving image including images recorded at a plurality of different recording speeds is subjected to time-line display, there arise the following problems:

In a case where the time-line display is performed at time intervals designated by a user, frame extraction is performed at a frame interval determined with reference to a normal recording speed part of the moving image. In this case, if frame extraction is performed at the determined frame interval with respect to images recorded at another recording speed, the time-line display of the images is not performed at the designated time intervals. For example, assuming that the time-line display at intervals of one second is performed with respect to a moving image including a normal recording speed part which is recorded at 30 FPS, in this case, images of the frames forming the moving image are each extracted every 30 frames. Further, when the same processing is performed for images recorded at ½× speed, the images are extracted not at the intervals of one second, but at the intervals of 0.5 seconds, with respect to the real time in recording the images.

As described above, one moving image includes images which, when subjected to the time-line display, are displayed at the time intervals designated by the user, and images which, when subjected to the time-line display, are not displayed at the time intervals designated by the user. This gives uncomfortable feeling to a user.

Further, assuming that a moving image of a scene including images recorded at a plurality of different recording speeds and a moving image of the same scene recorded only at the normal recording speed are subjected to the time-line display, side by side, in this case, some frames extracted and displayed are different between the moving images, and hence it is difficult to compare the moving images due to the display of different images at the corresponding frames.

SUMMARY OF THE INVENTION

The present invention provides a display control apparatus that is capable of performing time-line display of a moving image including a section recorded at a different recording speed from the real-time recording speed, at time intervals designated by a user, a method of controlling the same, and a storage medium.

In a first aspect of the present invention, there is provided a display control apparatus comprising a setting unit configured to set time intervals at which frames are extracted from a moving image, and a control unit configured to perform control such that a plurality of frames are extracted from the moving image at the time intervals set by the setting unit, and the plurality of extracted frames are displayed in a line, wherein in a case where a moving image includes a first section which was recorded at a recording frame rate which is the same as a reproduction frame rate, and a second section which was recorded at a frame rate different from the reproduction frame rate, the control unit performs control such that, from the first section, a plurality of frames are extracted at first frame intervals, and that, from the second section, a plurality of frames are extracted at second frame intervals different from the first frame intervals, whereby the pluralities of frames extracted from the first section and the second section, respectively, are displayed in a line.

In a second aspect of the present invention, there is provided a method of controlling a display control apparatus comprising setting time intervals at which frames are extracted from a moving image, performing control such that a plurality of frames are extracted from the moving image at the time intervals set by said setting, and the plurality of extracted frames are displayed in a line, and performing, in a case where a moving image includes a first section which was recorded at a recording frame rate which is the same as a reproduction frame rate, and a second section which was recorded at a frame rate different from the reproduction frame rate, such that, from the first section, a plurality of frames are extracted at first frame intervals, and that, from the second section, a plurality of frames are extracted at second frame intervals different from the first frame intervals, whereby the pluralities of frames extracted from the first section and the second section, respectively, are displayed in a line.

In a third aspect of the present invention, there is provided a non-transitory computer-readable storage medium storing a computer-executable program for executing a method of controlling a display control apparatus, wherein the method comprises setting time intervals at which frames are extracted from a moving image, performing control such that a plurality of frames are extracted from the moving image at the time intervals set by said setting, and the plurality of extracted frames are displayed in a line, and performing, in a case where a moving image includes a first section which was recorded at a recording frame rate which is the same as a reproduction frame rate, and a second section which was recorded at a frame rate different from the reproduction frame rate, such that, from the first section, a plurality of frames are extracted at first frame intervals, and that, from the second section, a plurality of frames are extracted at second frame intervals different from the first frame intervals, whereby the pluralities of frames extracted from the first section and the second section, respectively, are displayed in a line.

According to the present invention, it is possible to perform time-line display of a moving image including a section recorded at a different recording speed from the real-time recording speed, at time intervals designated by a user.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
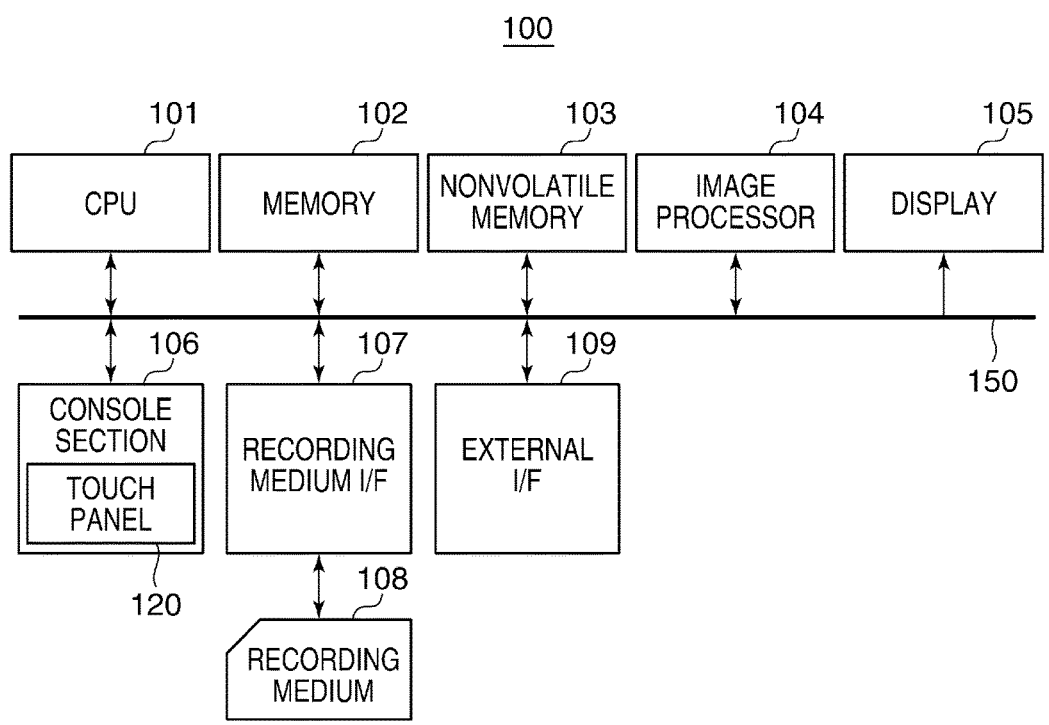
FIG. 1 is a block diagram of a digital video camera as an image pickup apparatus including a display control apparatus according to a first embodiment of the present invention.

FIG. 1 is a block diagram of an image pickup apparatus including a display controller (display control apparatus) according to a first embodiment of the present invention.

The illustrated image pickup apparatus is e.g. a digital video camera (hereinafter simply referred to as the camera) 100, and is capable of reproducing a moving image including a section recorded at a different recording speed from the real-time recording speed. The camera 100 includes a CPU 101, a memory 102, a nonvolatile memory 103, an image processor 104, a display (display section) 105, a console section 106, a recording medium interface 107, and an external interface 109. These blocks are interconnected by an internal bus 150.

The memory 102 is e.g. a RAM, and the CPU 101 controls the camera 100 according to programs stored in the nonvolatile memory 103 using the memory 102 as a work memory.

The nonvolatile memory 103 stores image data, audio data, and other data, and further stores various programs operated by the CPU 101, and so forth. The nonvolatile memory 103 is e.g. a hard disk (HD) or a ROM.

The image processor 104 performs predetermined image processing on image data under the control of the CPU 101. Examples of the image data on which image processing is to be performed include image data stored in the nonvolatile memory 103 and a recording medium 108, and image data acquired via the external interface 109. The image processing performed by the image processor 104 includes, for example, A/D conversion, D/A conversion, encoding, compression, decoding, enlarging/reduction (resizing), noise reduction, color conversion, development, and refocusing.

Although in the illustrated example, the image processor 104 is illustrated as a dedicated circuit block, image processing may be performed by the CPU 101 depending on a type of the image processing.

An image, a GUI screen forming a GUI (Graphical User Interface), and so forth, are displayed on the display 105 under the control of the CPU 101. For example, the CPU 101 controls the display 105 using a display control signal, and outputs a video signal corresponding to image data to the display 105. Then, a video (image) corresponding to the video signal is displayed on the display 105.

The console section 106 is an input device for receiving a user's operation. For example, the console section 106 is provided with a character information input device, such as a keyboard, a pointing device, such as a mouse and a touch panel 120, buttons, a dial, a joystick, a touch sensor, and a touch pad.

Note that the touch panel 120 is disposed in a state overlaid on the display 105, and outputs coordinate information associated with a position touched e.g. by a finger.

The recording medium 108, such as a memory card, a CD, and a DVD, is mounted in the recording medium interface 107. The CPU 101 reads mage data from the recording medium 108 and writes image data into the same, via the recording medium interface 107.

The external interface 109 is an interface which is connected to an external device via a wired cable or wirelessly, for inputting and outputting image data and an audio signal.

The CPU 101 detects the following operations or states on the touch panel 120:

An operation of touching the touch panel 120 by a finger or a pen (hereinafter referred to as "a touch-down"), a state of the touch panel 120 having been touched by the finger or the pen (hereinafter referred to as "a touch-on"), an operation of moving the finger or the pen on the touch panel 120 while being kept in contact with the same (hereinafter referred to as "a move"), an operation of moving the finger or the pen off the touch panel 120 (hereinafter referred to as "a touch-up"), and a state of the touch panel 120 which is not being touched by anything (hereinafter referred to as "a touch-off").

Information indicative of the above-mentioned operations or states, and the coordinate positions on the touch panel 120 at which the finger or the pen has touched is sent to the CPU 101 via the internal bus 150. The CPU 101 determines, based on the notified information, what operation has been performed on the touch panel 120. The CPU 101 determines a direction of movement of the finger or the pen in a move based on changes of the position coordinates. At this time, the CPU 101 determines vertical and horizontal components of the direction of movement of the finger or the pen based on changes of the position coordinates.

When the touch panel 120 is touched down and then touched up after a certain move, this operation is referred to as "drawing a stroke". Further, an operation of drawing a stroke quickly will be referred to as "a flick". The flick is an operation of quickly moving a finger or a pen for a certain distance while keeping the finger or the pen in contact with the touch panel 120 and then moving the finger or the pen off the same. In other words, the flick is an operation of quickly moving a finger or a pen on the touch panel 120 as if flicking the finger or the pen against the touch panel 120.

When detecting that a move of a predetermined distance or more has been performed at a predetermined speed or higher and detecting a touch-up in the state, the CPU 101 determines that a flick has been performed. Further, when detecting that a move of a predetermined distance or more has been performed at a speed lower than the predetermined speed, the CPU 101 determines that a drag has been performed.

Note that the touch panel 120 may be implemented by any one of various types, such as a resistive film type, a capacitive type, a surface acoustic wave type, an infrared type, an electromagnetic induction type, an image recognition type, and an optical sensor type.

In the illustrated example, the camera 100 has a mode for displaying a GUI for performing an operation concerning reproduction of a moving image on the display 105. In this mode, a moving image to be reproduced is displayed in such a manner that buttons for receiving various operations are superimposed on the moving image.

Figure 2A:
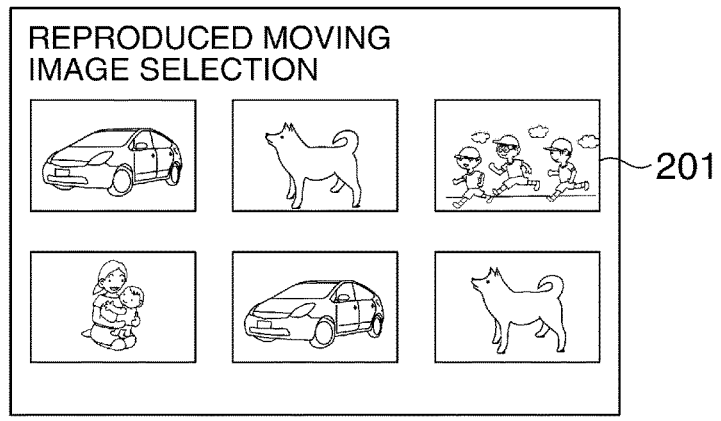
FIGS. 2A to 2C are diagrams each of which is useful in explaining an example of a screen displayed on a display of the digital video camera.
Figure 2B:
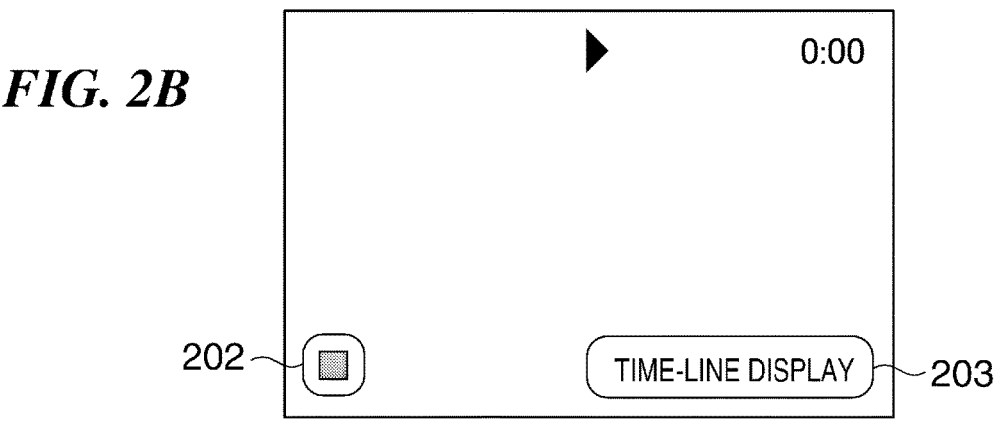
Figure 2C:
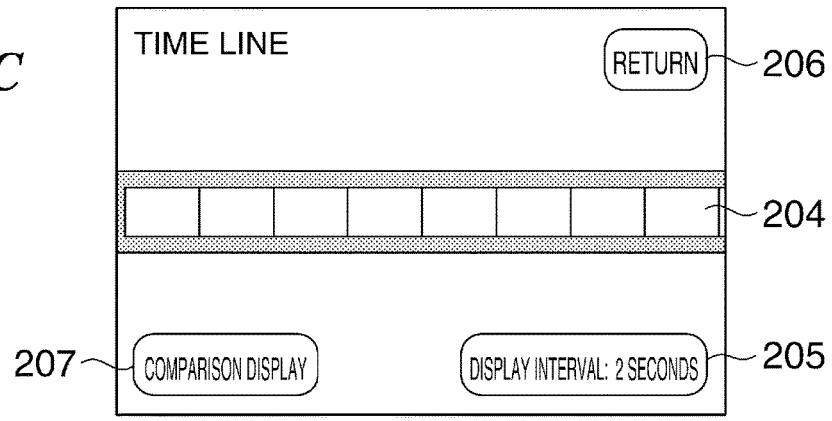

FIGS. 2A to 2C are diagrams each of which is useful in explaining an example of a screen displayed on the display of the camera shown in FIG. 1. FIG. 2A shows a reproduced moving image selection screen, which is displayed for selecting a moving image file to be reproduced, FIG. 2B shows an example of a moving image reproduction screen, and FIG. 2C shows an example of a time-line display screen.

On the reproduced moving image selection screen shown in FIG. 2A, images positioned at respective first frames of a plurality of moving image files are displayed in a reduced size as thumbnail images 201. That is, one thumbnail image is displayed for one moving image file. When a user touches one of the thumbnail images 201, the CPU 101 starts reproduction of the moving image file corresponding to the touched thumbnail image. When reproduction of the moving image file is started, the screen is shifted to the moving image reproduction screen shown in FIG. 2B.

A moving image reproduction stop button 202 is displayed on the moving image reproduction screen. When the user touches the moving image reproduction stop button 202, the CPU 101 stops reproduction of the moving image file. Then, the CPU 101 shifts the screen to the reproduced moving image selection screen.

A time-line display button 203 is displayed on the moving image reproduction screen. When the user touches the time-line display button 203, the CPU 101 shifts the screen to the time-line display screen. At this time, the CPU 101 performs processing for extracting frames at predetermined time intervals from the moving image being currently reproduced. Then, the CPU 101 performs the time-line display by displaying the images positioned at the extracted frames, in a line, in a reduced size.

A time-line display area 204 is displayed on the time-line display screen shown in FIG. 2C. In the time-line display area 204, the thumbnail images obtained by reducing the images positioned at the frames extracted from the moving image file are sequentially displayed from the left, as viewed in FIG. 2C. Further, a display interval selection button 205 is displayed on the time-line display screen. When the user touches the display interval selection button 205, the CPU 101 shifts the screen to a display interval selection screen for selecting an interval at which each thumbnail image is extracted which is to be displayed in the time-line display area 204.

When the user touches a return button 206, the CPU 101 shifts the screen to the moving image reproduction screen. Further, when the user touches a comparison display button 207, the CPU 101 shifts the screen to a comparison target moving image selection screen for selecting a moving image file to be displayed for comparison with the moving image file being currently subjected to the time-line display.

Figure 3A:
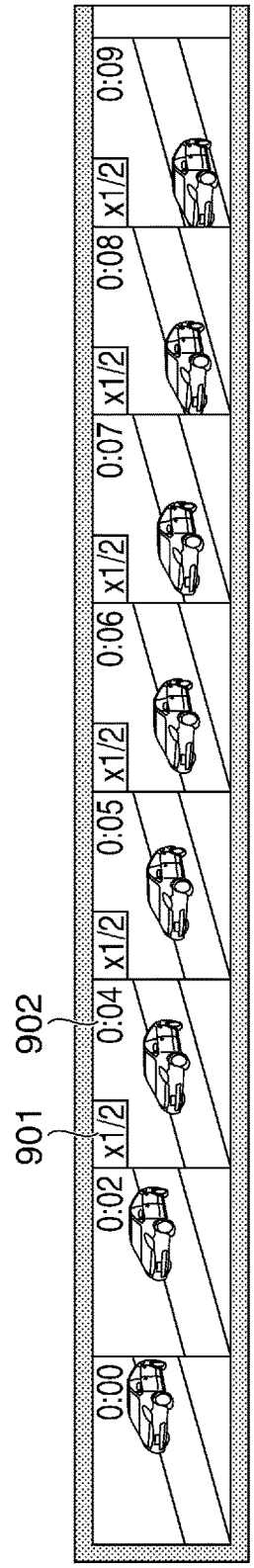
FIGS. 3A and 3B are diagrams each of which is useful in explaining an example of thumbnail images displayed in a time-line display area, appearing in FIG. 2C.
Figure 3B:
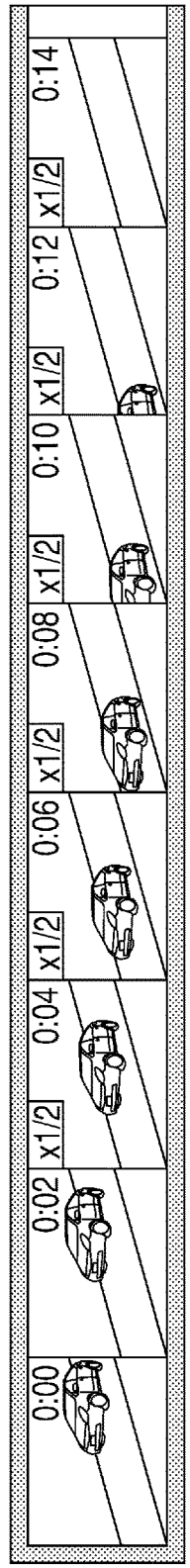

FIGS. 3A and 3B are diagrams each of which is useful in explaining an example of the thumbnail images displayed in the time-line display area 204, appearing in FIG. 2C. Although in both of FIGS. 3A and 3B, the time-line display is performed at display intervals set to two seconds for the same moving image file, the method of processing the time-line display is different between FIGS. 3A and 3B. Further, this moving image file has a reproduction frame rate of 30 FPS. In this moving image file, the first 120 frames (0-th to 119-th frames) were recorded at a recording frame rate of 30 FPS, and the following 720 frames (120-th to 839-th frames) were recorded at a recording frame rate of 60 FPS. Since the moving image has 840 frames in total, when the moving image is reproduced at the reproduction frame rate of 30 FPS, a reproduction time period which it take to complete the reproduction is 28 seconds, but a recording time which it actually took to record the moving image is 16 seconds.

Referring to FIG. 3A, the plurality of thumbnail images are sequentially displayed in the time-line display area. A recording speed 901 and a time count 902 are displayed on each of the thumbnail images (i.e. frames).

The recoding speed 901 indicates a recording speed set when a frame was recorded, and for example, "×½" indicates that the corresponding frame was recorded at ½× speed. Note that a frame without the display of the recording speed 901 is a frame recorded at a normal recording speed (the reproduction frame rate is equal to the recording frame rate). The time count 902 indicates a time period elapsed from the start of recording. For example, "0:04" indicates that the corresponding frame was recorded after four seconds from the start of recording. Although in the present embodiment, the time count 902 indicates a time period corresponding to a recording time period, a time count corresponding to a reproduction time period may be displayed. Further, in the present embodiment, the recording speed 901 indicates a value of (reproduction frame rate)/(recording frame rate), which is a ratio of the reproduction frame rate to the recording frame rate. That is, if the recording frame rate is higher, the recording speed becomes lower, and when the moving image is reproduced at the reproduction frame rate, the moving image is reproduced in slow motion, whereas if the recording frame rate is lower, the recording speed becomes higher, and when the moving image is reproduced at the reproduction frame rate, the moving image is reproduced at high speed.

In the example shown in FIG. 3A, starting with the first frame of the moving image file, processing is performed for extracting a frame every two seconds and displaying the extracted frames in a reduced size. More specifically, in the moving image file having the reproduction frame rate of 30

FPS, frames are each extracted every two seconds, i.e. at intervals of 60 frames, and the extracted frames are displayed in a reduced size. The method of performing the time-line display as shown in FIG. 3A will be described in detail hereinafter with reference to FIGS. 8A and 8B.

The normal recording speed (reproduction frame rate) is 30 FPS, and hence, by extracting each frame, at the intervals of two seconds with respect to the reproduction time period, i.e. at the intervals of 60 frames, it is possible to extract each frame at the intervals of two seconds of the recording time, with respect to frames recorded at the normal recording speed (30 FPS). However, with respect to frames recorded at ½× speed (60 FPS), frames are each extracted at intervals of one second of the recording time.

On the other hand, in the example shown in FIG. 3B, starting with the first frame of the moving image, frames are each extracted every two seconds of the recording time, and displayed in a reduced size. In this case, a frame to be extracted is determined based on the time interval (two-second interval) at which each frame is extracted and the recording speed (recording frame rate). This makes it possible to extract each frame at intervals of two seconds of the recording time even from frames which were recorded at ½× speed. The method of performing the time-line display as shown in FIG. 3B will be described in detail hereinafter with reference to FIGS. 5A and 5B.

Figure 4:
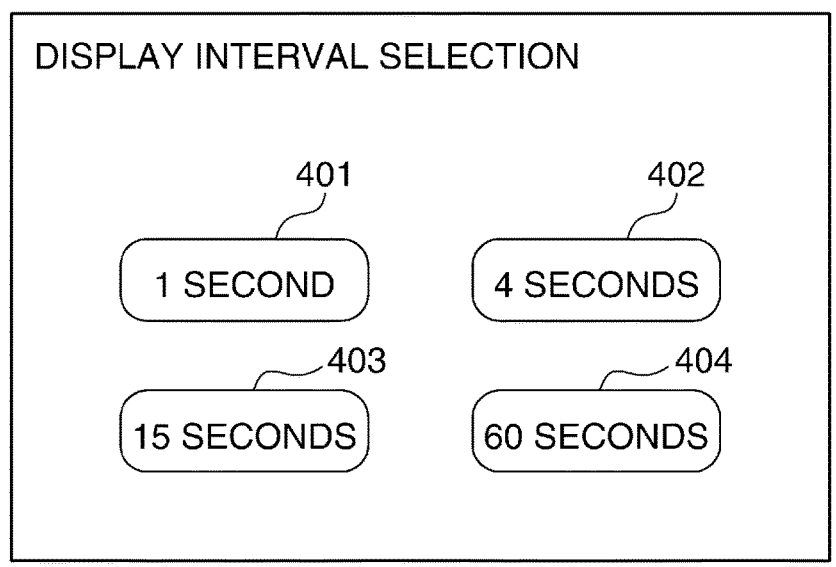
FIG. 4 is a diagram showing an example of a display interval selection screen displayed on the display of the digital video camera.

FIG. 4 is a diagram showing an example of the display interval selection screen displayed on the display of the camera shown in FIG. 1.

In the illustrated example, as buttons for selecting a display interval, a one-second button 401, a four-second button 402, a 15-second button 403, and a 60-second button 405 are displayed. When the user touches one of these buttons 401 to 404, the CPU 101 sets a display interval corresponding to the touched button. Then, the CPU 101 displays the time-line display screen on the display 105, and updates the thumbnail images to be displayed in the time-line display area 204 according to the set display interval.

Figure 5A:
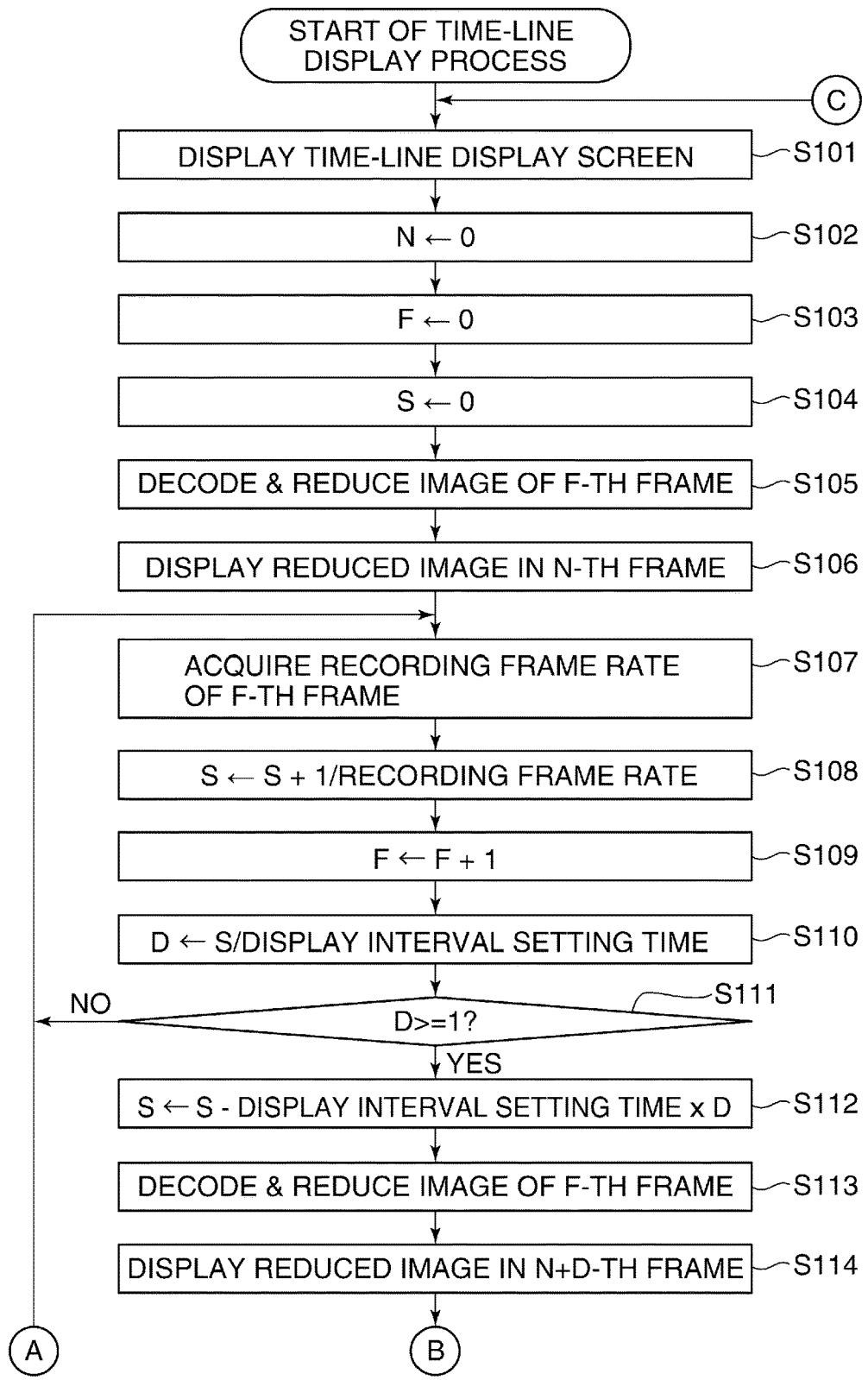
FIGS. 5A and 5B are a flowchart of a time-line display process.
Figure 5B:
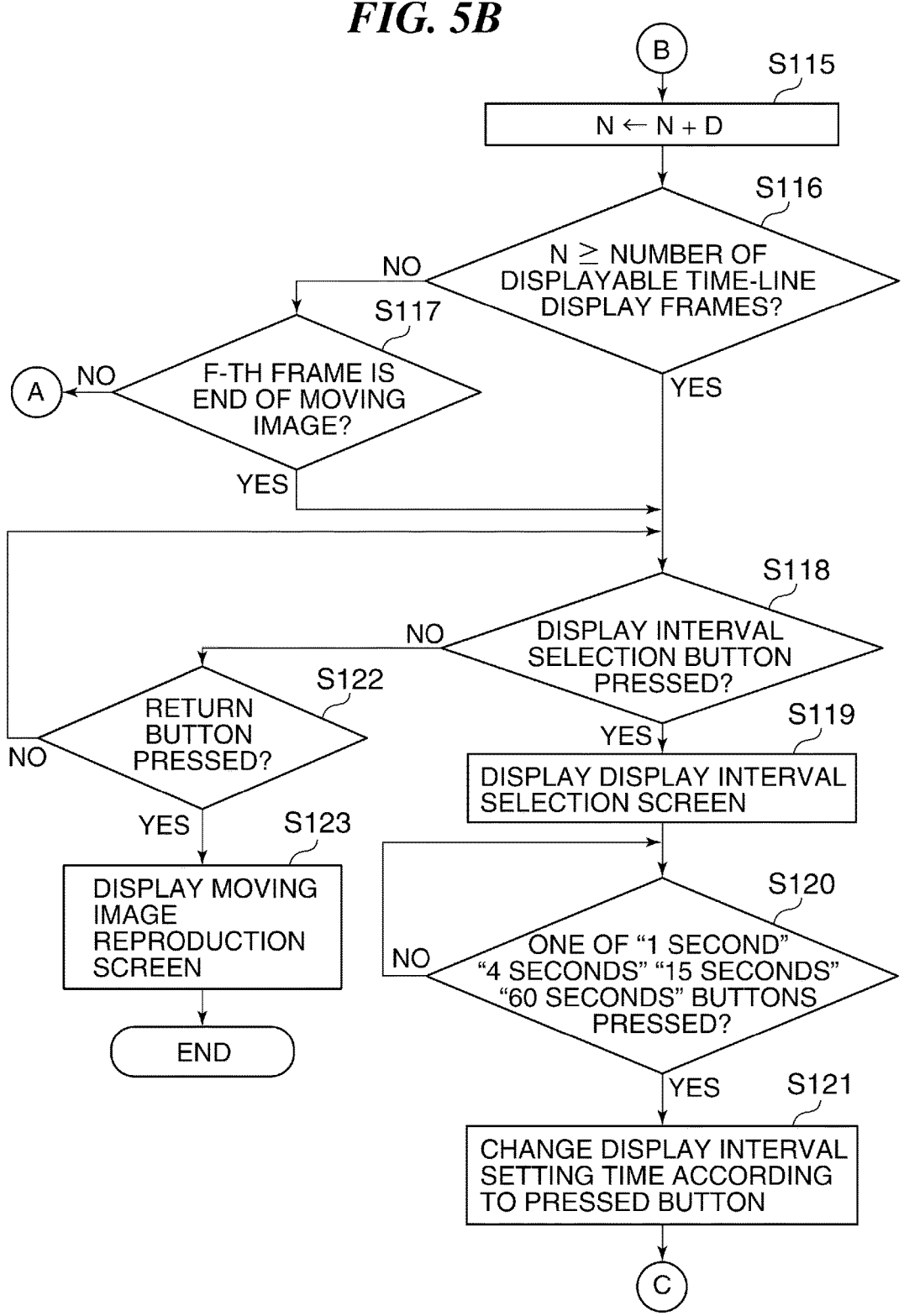

FIGS. 5A and 5B are a flowchart of a time-line display process performed by the camera shown in FIG. 1. By performing the time-line display process in FIGS. 5A and 5B, such time-line display as shown in FIG. 3B is performed. In this process, when the user touches the time-line display button 203 on the moving image reproduction screen, the CPU 101 performs the time-line display process. Note that in the illustrated example, a value of "1" indicative of one second is set as a display interval setting time in the initial state.

First, the CPU 101 controls the image processor 104 to display the time-line display screen on the display 105 (step S101). Then, the CPU 101 substitutes "0" into a variable N (step S102). The variable N is a value indicating, when an image extracted from the moving image file is displayed in a reduced size, a place of the extracted image, counted from the left, in the time-line display area 204. When the variable N is equal to "0", the image is displayed in a reduced size at a left end frame (position) in the time-line display area 204. Note that in the following description, a frame in which a thumbnail image (hereinafter also referred to as the reduced image) is displayed in the time-line display area 204 is referred to as the time-line display frame.

Then, the CPU 101 substitutes "0" into a variable F (step S103). The variable F is a value indicating the number of a frame in the moving image file. When the variable F is equal to "0", the variable F indicates the first frame of the moving image file.

Next, the CPU 101 substitutes "0" into a variable S (step S104). The variable S is a value indicating a time period over which frames have been processed after the preceding thumbnail image was displayed in the time-line display area 204, and is expressed in units of seconds.

Then, the CPU 101 reads image data of the F-th frame from the recording medium 108, and controls the image processor 104 to decode the image data, and reduce the size of image data (convert the image data into a thumbnail image) (step S105). In this step, since the variable F is equal to "0", the image data of the first frame of the moving image file is decoded. Then, the image processor 104 writes the decoded and reduced image data into the memory 102.

Next, the CPU 101 controls the image processor 104 to display the image data (thumbnail image data) written into the memory 102 in the N-th time-line display frame in the time-line display area 204 (step S106). Then, the CPU 101 reads the recording frame rate of the F-th frame from the recording medium 108 (step S107). Note that the recording frame rate is expressed in FPS.

Then, the CPU 101 adds a time period elapsed during photographing from when the frame indicated by the variable F (i.e. F-th frame) was recorded to when the next frame was recorded, to the variable S (step S108). This elapsed time period can be obtained by 1/recording frame rate, using the recording frame rate read in the step S107. Then, the CPU 101 increments the variable F, i.e. adds "1" to the variable F (step S109). With this, the frame to be processed in the moving image file is changed to the next one.

Next, the CPU 101 calculates S/display interval setting time, using the display interval setting time which is currently set (by rounding down to the nearest decimal), and substitutes the obtained value into a variable D (step S110).

Since the recording time to be elapsed from the preceding frame displayed in the time-line display area 204 to the F-th frame has been substituted in the variable S, if the variable D is equal to "1", this indicates that frames corresponding to the display interval setting time have been processed. On the other hand, if the variable D is equal e.g. to "2" or more, this indicates that frames corresponding to a value obtained by the display interval setting time×variable D (=value not smaller than 2) have been processed.

Then, the CPU 101 determines whether or not the variable D is not smaller than "1" (step S111). If the variable D is smaller than "1" (NO to the step S111), the CPU 101 returns to the step S107, and repeats the steps S107 to S110 until the variable D becomes equal to 1 or more. On the other hand, if the variable D is not smaller than "1" (YES to the step S111), the CPU 101 determines that the time period elapsed from the preceding frame displayed in the time-line display area 204 to the F-th frame has become equal to the display interval setting time or more. If frames were recorded at the normal frame rate of the moving image, the time period elapsed during photographing between two adjacent frames which are to be displayed in the time-line display area 204 is not larger than the display interval setting time, and hence, accumulation of the elapsed time period by repeated execution of the steps S107 and S108 causes the variable D to gradually increase from 0, until the variable D reaches 1 in the step S111. However, in a case where the frame rate is so low that the time period elapsed during photographing between two adjacent frames is larger than the display interval setting time, the variable D sometimes becomes equal to e.g. 2 or more. Next, the CPU 101 calculates the display interval setting time×variable D, and subtracts the obtained value from the variable S (step S112).

Then, the CPU 101 reads image data of the F-th frame updated by executing the step S109 from the recording medium 108, and controls the image processor 104 to decode the read image data, and reduce the size of the image data (convert the image data into a thumbnail image) (step S113). Then, the image processor 104 writes the decoded and reduced image data into the memory 102.

Next, the CPU 101 controls the image processor 104 to display the image data (thumbnail image data) written into the memory 102 in the N+D-th time-line display frame in the time-line display area 204 (step S114). Assuming that the moving image is a normal moving image, the variable D should become equal to 1, and hence the reduced image of the F-th frame is displayed in a frame (N+1) next to the frame (N) in which the preceding reduced image is displayed. In a case where the variable D is equal to e.g. 2 or more, this indicates that a time period elapsed from the frame displayed last time is not smaller than twice the display interval setting time, and hence the reduced image of the F-th frame is to be displayed not in the next frame but in a frame (N+D) further away from the frame (N) in which the preceding reduced image is displayed.

Then, the CPU 101 adds the variable D to the variable N so as to cause the variable N to indicate the frame in which the reduced image is displayed this time (step S115). Then, the CPU 101 determines whether or not the reduced images have been displayed which correspond in number to the time-line display frames which can be displayed (step S116). In this step, the CPU 101 determines whether or not the variable N has reached the number of time-line display frames which can be displayed. If the variable N has reached the number of time-line display frames which can be displayed, i.e. if the variable N becomes equal to or more than the number of time-line display frames which can be displayed, the CPU 101 determines that the reduced images have been displayed which correspond in number to the time-line display frames which can be displayed.

If the variable N has not reached the number of time-line display frames which can be displayed (NO to the step S116), the CPU 101 determines whether or not the F-th frame displayed as the thumbnail image is the end frame of the moving image file (step S117). If the F-th frame displayed as the thumbnail image is not the end frame of the moving image file (NO to the step S117), the CPU 101 returns to the step S107.

If the F-th frame displayed as the thumbnail image is the end frame of the moving image file (YES to the step S117), the CPU 101 determines whether or not the display interval selection button 205 has been touched (step S118). Note that if the variable N has reached the number of the time-line display frames which can be displayed (YES to the step S116), the CPU 101 also proceeds to the step S118.

If the display interval selection button 205 has been touched (YES to the step S118), the CPU 101 controls the image processor 104 to display the display interval selection screen (step S119). After that, the CPU 101 determines whether or not one of the one-second button 401, the four-second button 402, the 15-second button 403, and the 60-second button 405, which are displayed on the display 105, has been touched (step S120).

If any of the buttons has not been touched (NO to the step S120), the CPU 101 waits. If one of the buttons has been touched (YES to the step S120), the CPU 101 sets the display interval setting time based on the touched button (step S121). For example, when the one-second button 401 has been touched, the CPU 101 sets "1" as the display interval setting time. Similarly, when the four-second button 402, the 15-second button 403, or the 60-second button 405 has been touched, the CPU 101 sets "4", "15", or "60" as the display interval setting time. Then, the CPU 101 returns to the step S101.

If the display interval selection button 205 has not been touched (NO to the step S118), the CPU 101 determines whether or not the return button 206 has been touched (step S122). If the return button 206 has not been touched (NO to the step S122), the CPU 101 returns to the step S118. On the other hand, if the return button 206 has been touched (YES to the step S122), the CPU 101 controls the image processor 104 to display the moving image reproduction screen, shown in FIG. 2B, on the display 105 (step S123). Then, the CPU 101 terminates the time-line display process.

As described above, a frame interval at which each frame is extracted from a moving image file is determined based on the recording speed (recording frame rate) at which each specific frame was recorded in the moving image file. This makes it possible to perform the time-line display of the whole moving image at time intervals set based on the real time (recording time) during recording thereof. As a result, even when a moving image includes images recorded at a plurality of different recording speeds, the display of a time line of reduced images extracted from the moving image file is performed at different frame intervals for respective sections of the moving image recorded at different recording speeds, and hence it is possible to perform the time-line display at the time intervals designated by the user.

Note that when one of the reduced images displayed on the time-line display screen is selected using the console section 106, the CPU 101 may perform reproduction processing for reproducing the moving image from the frame indicated by the selected reduced image. In this case, the moving image is reproduced from the frame designated to be reproduced at the reproduction frame rate of the moving image regardless of the recording frame rate. In the time-line display process in FIGS. 5A and 5B, the frames are extracted such that an interval of recording time at which each reduced image (frame) to be displayed was recorded becomes equal to the set time interval. That is, the time-line display is performed according to the recording time of the moving image. Therefore, in a section of the moving image, in which the reproduction frame rate and the recording frame rate are different from each other, the moving image is reproduced at intervals different from the time intervals set for the time line.

A description will be given of a case where comparison display processing for displaying one moving image file and another moving image file for comparison is performed.

Figure 6A:
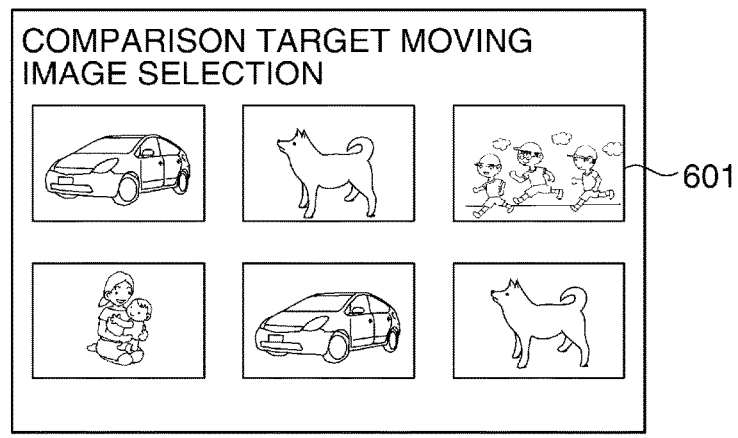
FIGS. 6A to 6C are diagrams useful in explaining comparison display processing.
Figure 6B:
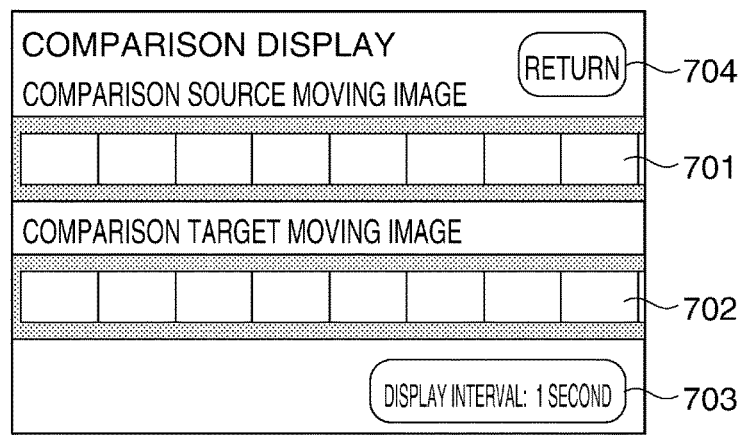
Figure 6C:
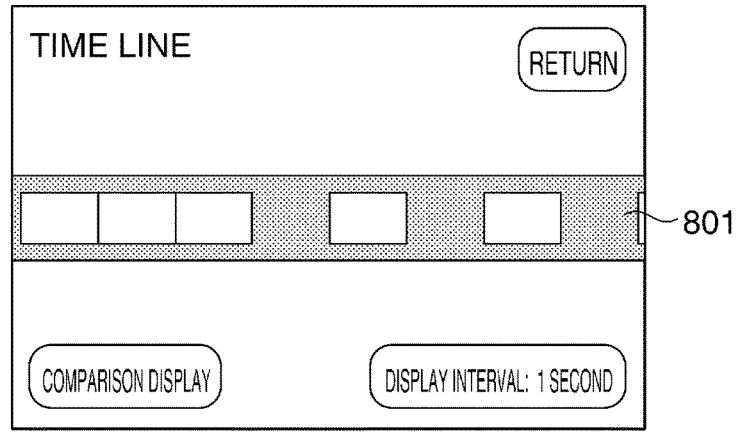

FIGS. 6A to 6C are diagrams useful in explaining the comparison display processing, performed by the camera shown in FIG. 1. FIG. 6A shows an example of the comparison target moving image selection screen, FIG. 6B shows an example of a comparison display screen, and FIG. 6C shows an example of the time-line display screen.

Thumbnail images 601 of the respective first frames of the moving image files to be compared are displayed on the comparison target moving image selection screen shown in FIG. 6A. As shown in FIG. 6A, one thumbnail image 601 is displayed for one moving image file, and when the user touches one of the thumbnail images 601, the CPU 101 performs the comparison display processing for the selected moving image file and a moving image file as a comparison source, and displays the comparison display screen, shown in FIG. 6B, on the display 105.

The comparison display screen is used when comparing one moving image file with another moving image file. A comparison source time-line display area 701 and a comparison target time-line display area 702 are displayed on the comparison display screen, shown in FIG. 6B. In the comparison source time-line display area 701, the thumbnail images extracted from the comparison source moving image file are displayed in the time-line display frames sequentially from the left. In the comparison target time-line display area 702, the thumbnail images extracted from the comparison target moving image file are displayed in the time-line display frames sequentially from the left.

Further, a display interval selection button 703 and a return button 704 are displayed on the comparison display screen. When the user touches the display interval selection button 703, the CPU 101 displays the display interval selection screen for selecting an interval at which each reduced image is extracted which is to be displayed in the comparison source time-line display area 701 and the comparison target time-line display area 702. Further, when the user touches the return button 704, the CPU 101 shifts the screen to the time-line display screen.

Figure 7A:
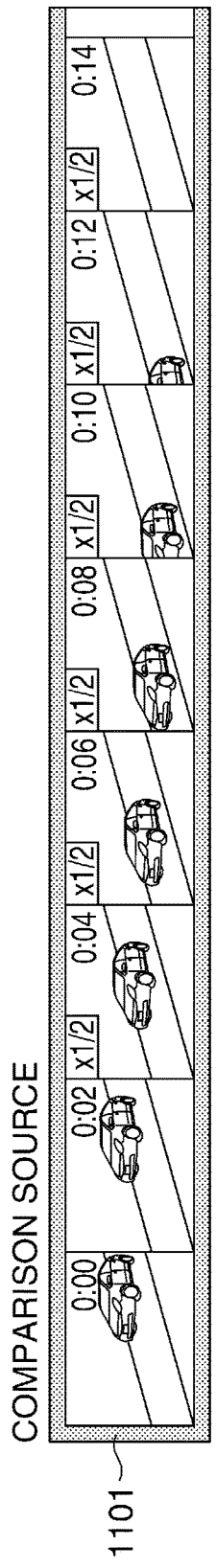
FIGS. 7A and 7B are diagrams useful in explaining thumbnail images displayed in a comparison source time-line display area and a comparison target time-line display area, respectively.
Figure 7B:
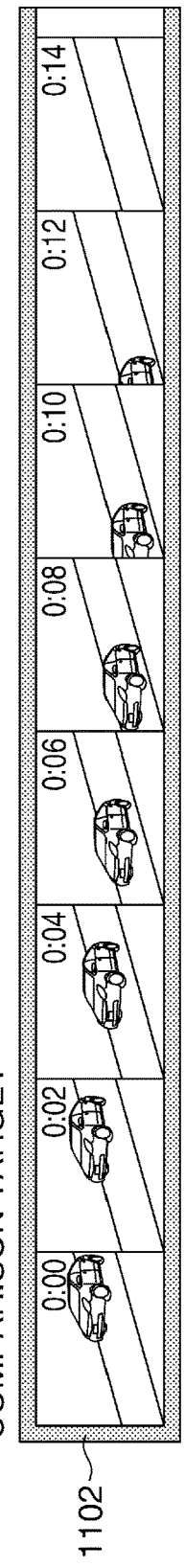

FIGS. 7A and 7B are diagrams useful in explaining the thumbnail images displayed in the comparison source time-line display area and the comparison target time-line display area, respectively. FIG. 7A shows an example of the comparison source time-line display area, and FIG. 7B shows an example of the comparison target time-line display area.

Referring to FIG. 7A, a plurality of thumbnail images are sequentially displayed in the comparison source time-line display area denoted by reference numeral 1101. In this time line, frames are each extracted at intervals of two seconds, and frames after four seconds from the start of recording were recorded at ½× speed.

Referring to FIG. 7B, a plurality of thumbnail images are sequentially displayed in the comparison target time-line display area denoted by reference numeral 1102. In this time line, frames are each extracted at intervals of two seconds, and frames were recorded at the normal speed from the start of recording.

As shown in FIGS. 7A and 7B, in the comparison source time-line display area 1101 and the comparison target time-line display area 1102, frames identical in time elapsed from the start of recording are displayed in respective time-line display frames at identical positions in the time axis.

Figure 8A:
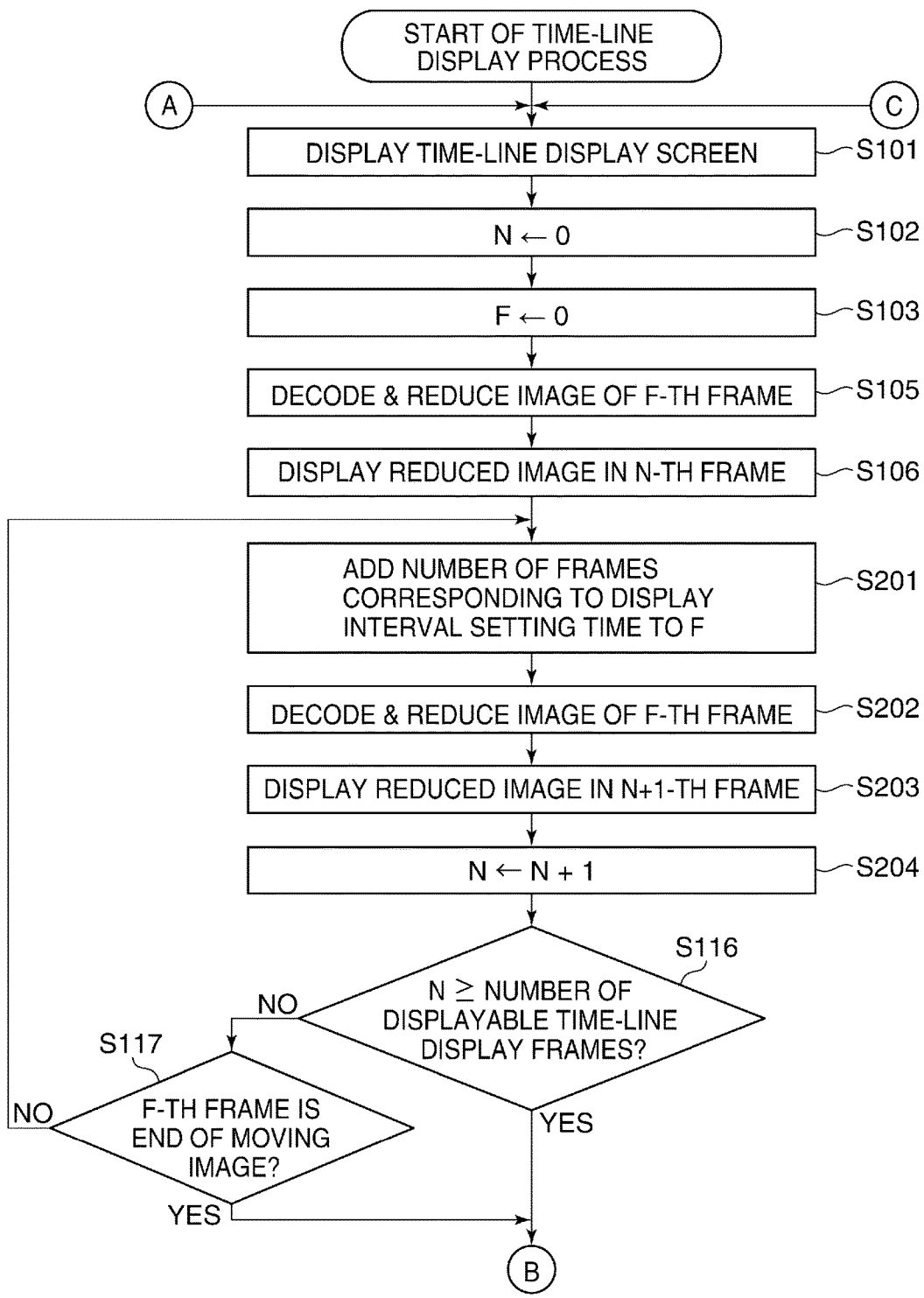
FIGS. 8A and 8B are a flowchart of a first variation of the time-line display process.
Figure 8B:
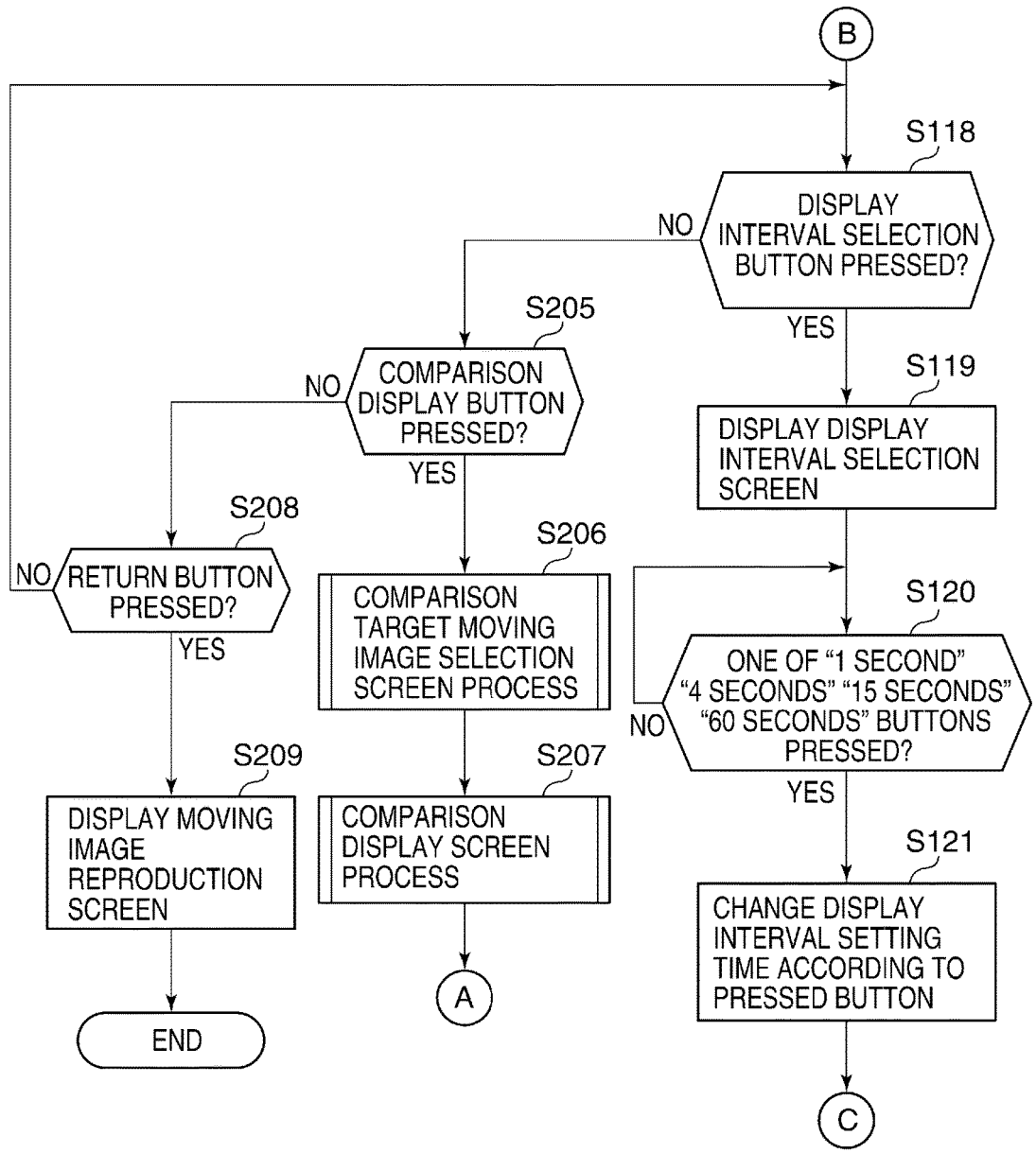

FIGS. 8A and 8B are a flowchart of a first variation of the time-line display process performed by the camera shown in FIG. 1. By performing the first variation of the time-line display process in FIGS. 8A and 8B, such time-line display as shown in FIG. 3A is performed. In this process, when the user touches the time-line display button 203 on the moving image reproduction screen, the CPU 101 performs the time-line display process. Note that the same steps in the process in FIGS. 8A and 8B as those in the time-line display process in FIGS. 5A and 5B are denoted by the same step numbers, and description thereof is omitted. Further, whether to perform the time-line display process shown in FIGS. 5A and 5B or the first variation of the time-line display process shown in FIGS. 8A and 8B may be made switchable by selection of a user.

After execution of the step S106, the CPU 101 adds the number of frames corresponding to the display interval setting time to the variable F (step S201). In this step, the CPU 101 adds a value obtained by calculating the display interval setting time×the normal recording frame rate to the variable F. The normal recording frame rate is equal to the reproduction frame rate, and hence the value to be added, i.e. the interval at which a frame is extracted may be determined by calculating the display interval setting time×the reproduction frame rate. After that, the CPU 101 reads the image data of the F-th frame from the recording medium 108, and controls the image processor 104 to decode and reduce the read image data (step S202). Then, the image processor 104 writes the decoded and reduced image data into the memory 102.

Then, the CPU 101 controls the image processor 104 to display the image data written into the memory 102 in the N+1-th frame in the time-line display area 204 (step S203). Then, the CPU 101 adds "1" to the variable N (step S204). This causes the variable N to indicate the frame in which the reduced image is displayed this time. After that, the CPU 101 executes the steps S116 to S121. Note that when one of the reduced images, displayed on the time-line display screen, is selected using the console section 106, the CPU 101 may perform reproduction processing for reproducing the moving image from the frame indicated by the selected reduced image. In this case, the moving image is reproduced from the frame designated to be reproduced at the reproduction frame rate of the moving image. In the first variation of the time-line display process, the frames are extracted such that an interval of reproduction time at which each reduced image (frame) to be displayed is reproduced becomes equal to the set time interval. Therefore, not only in the section in which frames were recorded at the normal recording speed, but also in the section in which frames were recorded at a recording frame rate different from the reproduction frame rate, the time-line display is performed according to the reproduction time of the moving image. That is, the time line is displayed according to the reproduction time of the moving image.

If it is determined in the step S118 that the display interval selection button 205 has not been touched (NO to the step S118), the CPU 101 determines whether or not the comparison display button 207 has been touched (step S205). If the comparison display button 207 has been touched (YES to the step S205), the CPU 101 performs a comparison target moving image selection screen process, described hereinafter (step S206). This comparison target moving image selection screen process is a process for selecting a moving image file to be compared with the moving image file being currently subjected to the time-line display.

Then, the CPU 101 performs a comparison display screen process, described hereinafter (step S207). This comparison display screen process is a process for displaying a moving image file being currently subjected to the time-line display and a comparison target moving image file, for comparison. After that, the CPU 101 returns to the step S101.

If the comparison display button 206 has not been touched (NO to the step S205), the CPU 101 determines whether or not the return button 206 has been touched (step S208). If the return button 207 has not been touched (NO to the step S208), the CPU 101 returns to the step S118.

If the return button 206 has been touched (YES to the step S208), the CPU 101 controls the image processor 104 to display the moving image reproduction screen on the display 105 (step S209). Then, the CPU 101 terminates the time-line display process.

Figure 9:
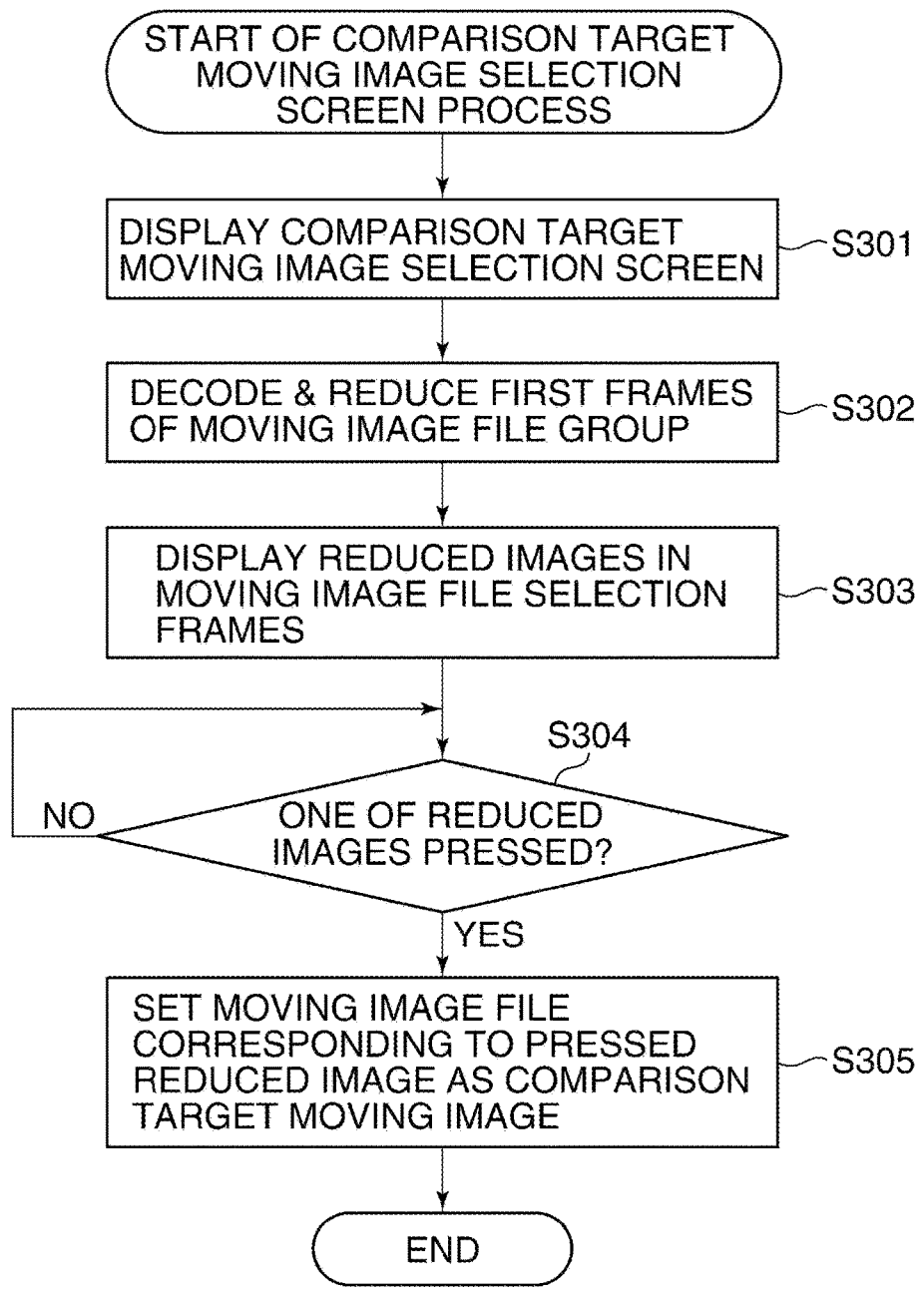
FIG. 9 is a flowchart of a comparison target moving image selection screen process.

FIG. 9 is a flowchart of the comparison target moving image selection screen process performed in the step S206 of the first variation of the time-line display process in FIG. 8B.

First, the CPU 101 controls the image processor 104 to display the comparison target moving image selection screen on the display 105 (step S301). Then, the CPU 101 reads image data of the first frame of each moving image file of a moving image file group to be compared from the recording medium 108, and controls the image processor 104 to decode and reduce the read image data (step S302). The image processor 104 writes each decoded and reduced image data into the memory 102.

Then, the CPU 101 controls the image processor 104 to display each image data (thumbnail image 601) written into the memory 102 in a moving image file selection frame (step S303). Then, the CPU 101 determines which of the thumbnail images 601 has been touched (step S304).

If no thumbnail images 601 has been touched (NO to the step S304), the CPU 101 waits. On the other hand, if one of the thumbnail images 601 has been touched (YES to the step S304), the CPU 101 sets a moving image file corresponding to the touched thumbnail image 601 as a comparison target moving image (step S305). Then, the CPU 101 terminates the comparison target moving image selection screen process.

Figure 10A:
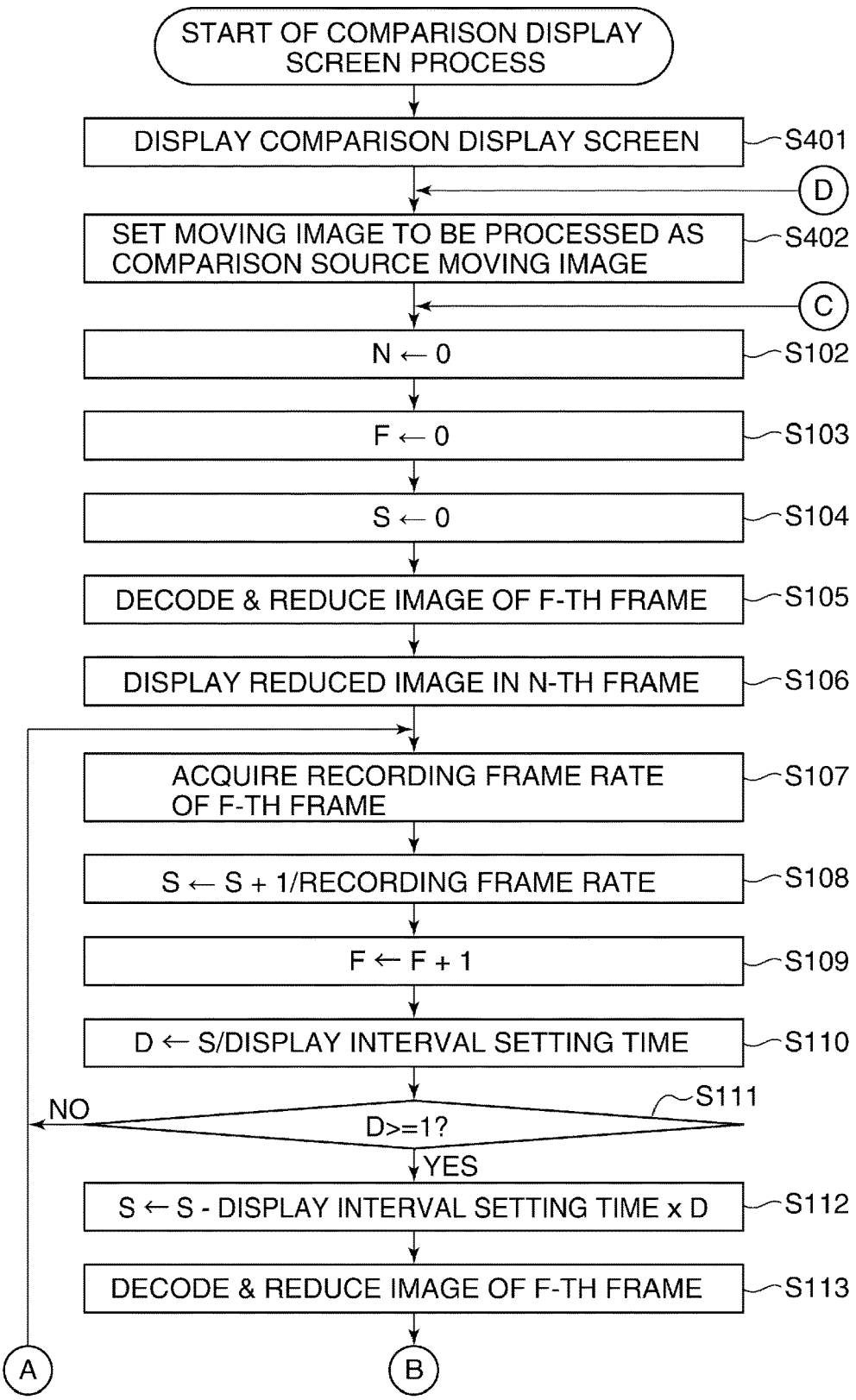
FIGS. 10A and 10B are a flowchart of a comparison display screen process.
Figure 10B:
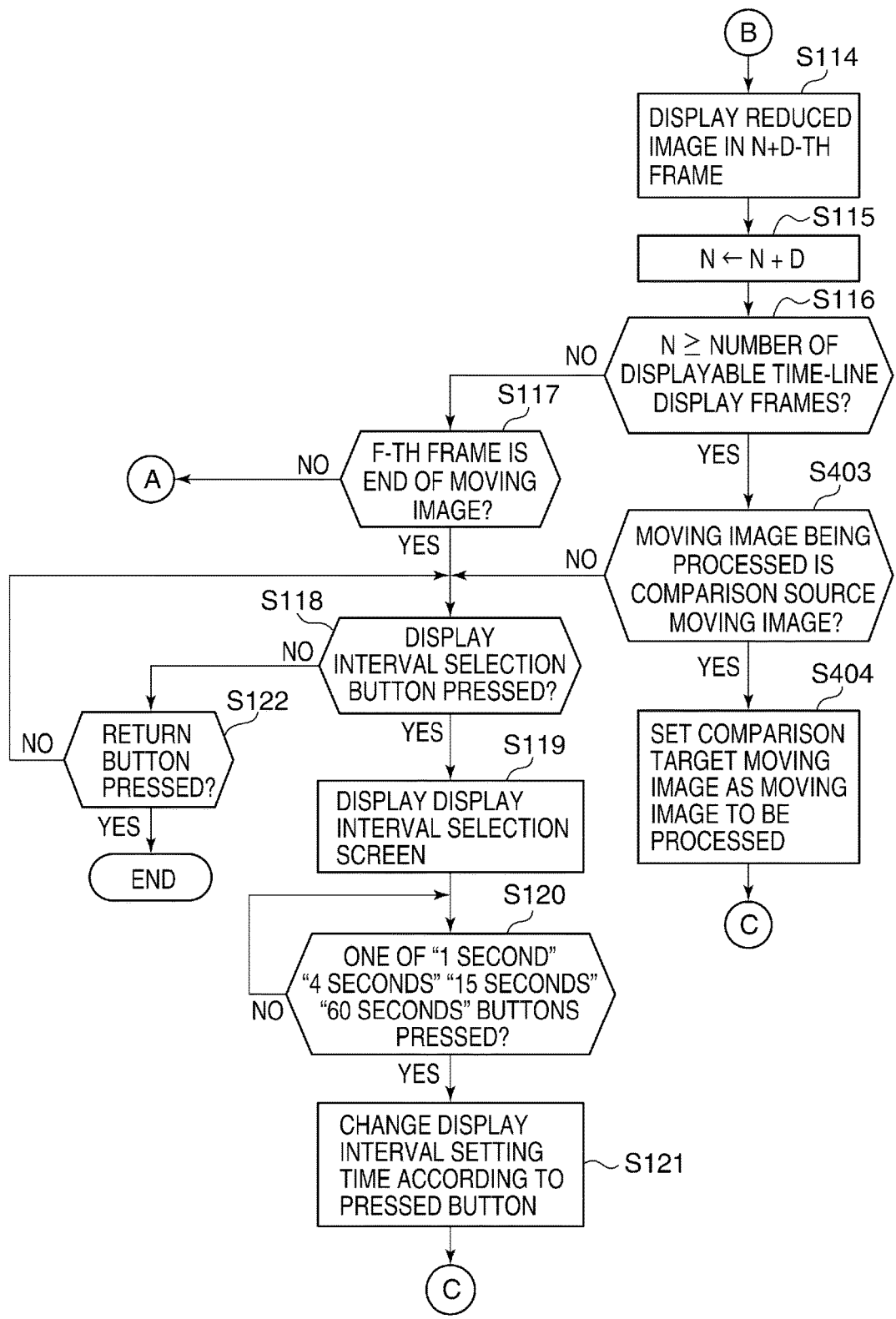

FIGS. 10A and 10B are a flowchart of the comparison display screen process performed in the step S207 of the first variation of the time-line display process in FIG. 8B. Note that the same steps in the process in FIGS. 10A and 10B as those in the time-line display process in FIGS. 5A and 5B are denoted by the same step numbers, and description thereof is omitted.

When the comparison display screen process is started, the CPU 101 controls the image processor 104 to display the comparison display screen on the display 105 (step S401). Then, the CPU 101 sets the moving image file on which the frame extraction processing is to be performed as a comparison source moving image (step S402). Then, the CPU 101 proceeds to the step S102.

The steps S102 to S122 are the same as the corresponding steps in FIGS. 5A and 5B.

If the variable N has reached the number of the time-line display frames which can be displayed (YES to the step S116), the CPU 101 determines whether or not the moving image being currently processed is the comparison source moving image (step S403). If the moving image being currently processed is the comparison source moving image (YES to the step S403), the CPU 101 sets the moving image on which the frame extraction processing is to be performed as a comparison target moving image (step S404). After that, the CPU 101 returns to the step S102. On the other hand, if the moving image being currently processed is not the comparison source moving image (NO to the step S403), the CPU 101 proceeds to the step S118.

By doing this, even a moving image including images recorded at a plurality of different recording speeds and a moving image recorded only at the normal recording speed are subjected to the time-line display, the frames are extracted and displayed at the same recording time intervals, and hence the user can easily compare these moving images. In comparing a plurality of moving images, if one of the moving images includes a section recorded at a different recording speed, even for the same reproduction time, images recorded at completely different recording times are sometimes displayed. Therefore, in the present embodiment, when performing the comparison display, frames are extracted such that the images are displayed at the same recording time intervals, for ease of comparison between the plurality of moving images. As described above, even when the time-line display, as shown in FIG. 3A, in which frames are extracted at fixed frame intervals (reproduction time intervals) is selected, if the comparison display is selected, extraction of frames is automatically switched to extraction of frames at recording time intervals, as described with reference to FIGS. 7A and 7B.

Next, a description will be given of an example in which when performing the time-line display, a frame to be extracted is determined based on the recording speed, and a position where the reduced image of the extracted frame is displayed is determined based on time at which the frame is reproduced.

Referring to FIG. 6C mentioned hereinabove, a time-line display area 801 is displayed on the illustrated time-line display screen. Differently from the time-line display area 204 appearing in FIG. 2C, there are spaces between reduced images in the time-line display area 801.

Figure 11A:
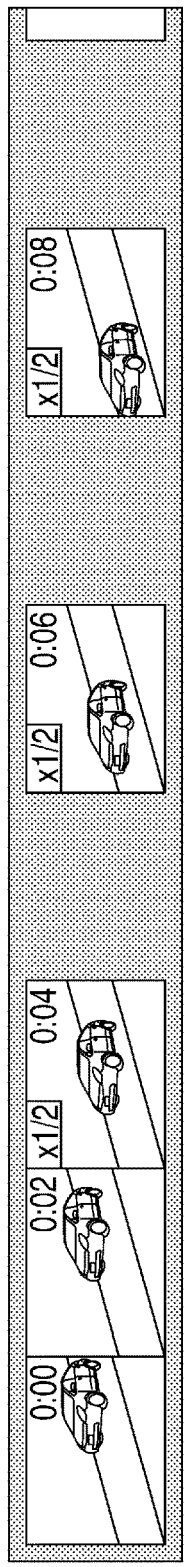
FIGS. 11A and 11B are diagrams each of which is useful in explaining the time-line display area.
Figure 11B:
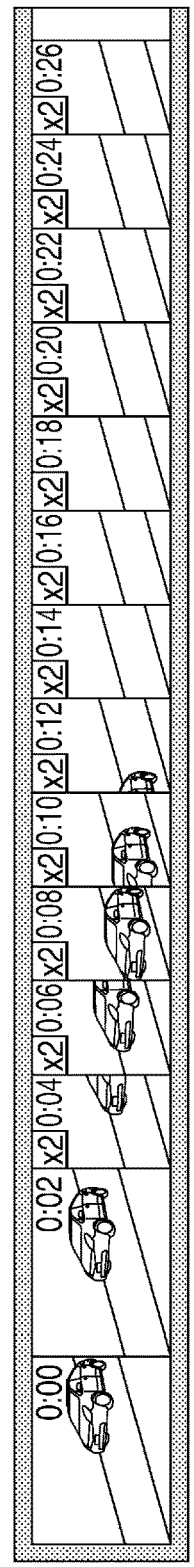

FIGS. 11A and 11B are diagrams useful in explaining the time-line display area appearing in FIG. 6C. FIG. 11A shows an example of the time-line display area, and FIG. 11B shows another example of the same.

Referring to FIG. 11A, there are displayed reduced images of frames extracted from the moving image file at intervals of two seconds of the recording time. Further, in time-line display frames after four seconds, which display frames, recorded at ½× speed, of the moving image file, each following reduced image is displayed with a space corresponding to one frame. That is, the position where a reduced image is displayed is determined based on the time at which the frame indicated by the reduced image is reproduced, and hence it takes twice the time to reproduce an image recorded at ½× speed, compared with reproduction of an image recorded at the normal speed. For this reason, when displaying the reduced image of the frame recorded at ½× speed, a double space is used for one reduced image.

FIG. 11B shows the time-line display associated with a moving image including images recorded at a recording speed higher than the normal speed. In the illustrated example, reduced images of frames extracted from the moving image file at intervals of two seconds of the recording time are displayed. In time-line display frames after four seconds, which display frames, recorded at double speed, of the moving image file, reduced images are each displayed in such a manner that the reduced image has the following reduced image overlapped on the right half of its time-line display frame. That is, since the position where a reduced image is displayed is determined based on time at which the frame indicated by the reduced image is to be reproduced, it takes only half time to reproduce an image recorded at double speed, compared with an image recorded at the normal speed. Therefore, when displaying the reduced image of the frame recorded at the double speed, a half space is used for one reduced image.

Figure 12A:
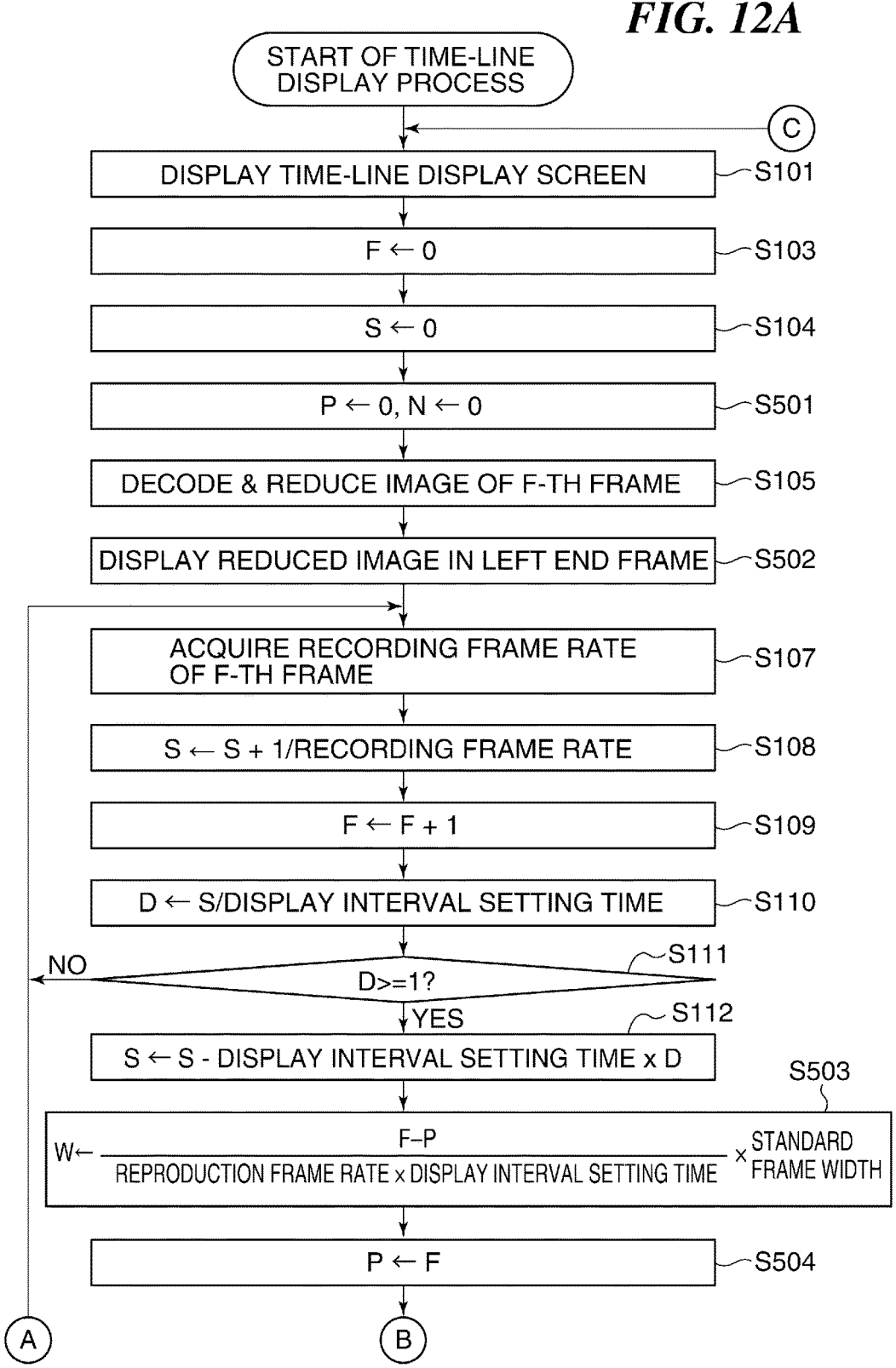
FIGS. 12A and 12B are a flowchart of a second variation of the time-line display process.
Figure 12B:
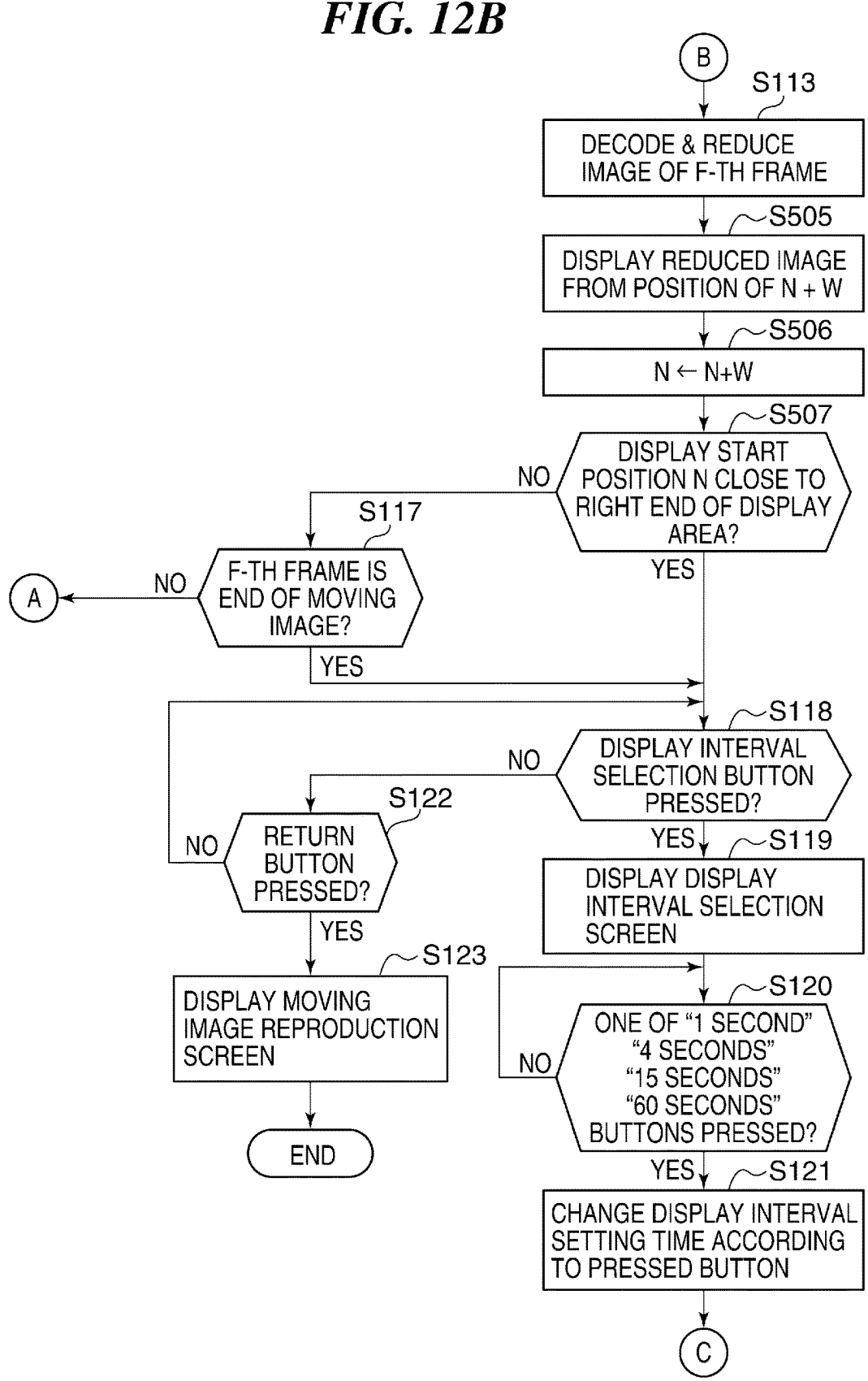

FIGS. 12A and 12B are a flowchart of a second variation of the time-line display process performed by the camera shown in FIG. 1. By performing the second variation of the time-line display process in FIGS. 12A and 12B, such time-line display as shown in FIG. 11A or 11B is performed. In this process, when the user touches the time-line display button 203 on the moving image reproduction screen, the CPU 101 performs the time-line display process. Note that the same steps in the time-line display process in FIGS. 12A and 12B as those in the time-line display process in FIGS. 5A and 5B are denoted by the same step numbers, and description thereof is omitted. Further, whether to perform the time-line display process shown in FIGS. 5A and 5B, or the first variation of the time-line display process shown in FIGS. 8A and 8B, or the time-line display process shown in FIGS. 12A and 12B may be made switchable by selection of a user.

After execution of the step S104, the CPU 101 substitutes "0" into a variable P, and substitutes "0" into the variable N indicative of a position where the reduced image is displayed (step S501). Here, the variable P is a value indicating a place of a frame extracted from the moving image file immediately before, counted from the first frame of the moving image file. When the variable P is equal to "0", this indicates that the frame extracted immediately before is the first frame. The variable N is a value indicating, when an image extracted from the moving image file is displayed in a reduced size, a place of the extracted image, counted from the left, in the time-line display area 204. When the variable N is equal to "0", the image is displayed in a reduced size at a left end frame (position) in the time-line display area 204. In other words, the variable N indicates a display start position at which a reduced image of a frame extracted from the moving image file immediately before is displayed on the time line. When the variable N is equal to "0", a reduced image has not been displayed on the time line yet. After that, the CPU 101 proceeds to the step S105.

After execution of the step S105, the CPU 101 controls the image processor 104 to display image data written into the memory 102 in the left end frame in the time-line display area 801 (step S502). After that, the CPU 101 proceeds to the step S107.

After execution of the step S112, the CPU 101 sets a value to a variable W (step S503). Here, the variable W is a value indicating an amount of shift of the display position from the position where the display of the preceding reduced image was started. In this step, the CPU 101 calculates {(F−P)/(frame rate×display interval setting time)}×standard frame width, and sets the obtained value as the variable W. The value expressed by (F−P) indicates a difference between the current frame number and the frame number of the preceding reduced image displayed. To cause a frame extracted at a frame interval corresponding to (reproduction frame rate×display interval setting time) to be displayed in a standard frame width, the variable W is set.

Then, the CPU 101 substitutes the value of the variable F into the variable P (step S504). Then, the CPU 101 proceeds to the step S113.

After execution of the step S113, the CPU 101 controls the image processor 104 to display the image data written into the memory 102 from a position expressed by N+W in the time-line display area 801 (step S505). That is, the reduced image is displayed from a position shifted from the position where the display of the preceding reduced image was started to the right by an amount indicated by the variable W. Then, the CPU 101 substitutes "N+W" into the variable N so as to cause the variable N to indicate the position where the display of the present reduced image displayed this time (displayed last time) is started (step S506). As described above, since the position where the reduced image is displayed is determined using the variable W, the display interval between adjacent reduced images is changed depending on the recording frame rate. However, in the standard frame width, a reduced image is displayed at the frame interval determined by the reproduction frame rate×display interval setting time, and hence the position where the display of the reduced image is started is at a position corresponding to the time at which the frame indicated by the reduced image is reproduced.

Then, the CPU 101 determines whether or not the display start position N of the reduced image displayed last time in the step S506 has come close to the right end of the time-line display area 801 (step S507). In this step, the CPU 101 subtracts the variable N from a value indicative of the right end of the time-line display area 801, and if the obtained value is not larger than a predetermined value, the CPU 101 determines that the display start position N has come close to the right end.

If the display start position N has come close to the right end (YES to the step S507), the CPU 101 proceeds to the step S118. On the other hand, if the display start position N has not come close to the right end yet (NO to the step S507), the CPU 101 proceeds to the step S117.

As described above, when displaying reduced images of images recorded at a recording speed lower than the normal recording speed, the display interval between the reduced images is increased. On the other hand, when displaying reduced images of images recorded at a recording speed higher than the normal recording speed, the display interval between the reduced images is reduced. This enables the user to intuitively grasp the difference in the recording speed.

In the embodiment of the present invention, the frame interval at which a frame is extracted from a moving image file is determined according to the recording speed at which each specific frame of the moving image was recorded and the set time interval. On the other hand, the frame interval at which a frame is extracted from a moving image file may be determined based on a time period elapsed from a time at which recording of a specific frame was started.

As described above, in the embodiment of the present invention, the extraction interval (frame interval) at which a frame is extracted from a moving image file is determined based on a recording speed at which each specific frame of the moving image was recorded. This makes it possible to perform the time-line display of the moving image at predetermined time intervals. As a result, even when the moving image includes images recorded at a plurality of different recording speeds, it is possible to perform the time-line display of the moving image at time intervals designated by the user.

Further, when performing the time-line display of a moving image including images recorded at a plurality of different recording speeds and a moving image recorded at a normal speed, side by side, for comparison, the images of frames at the corresponding recording time are displayed in the corresponding time line display frames, and hence the user can easily compare the moving images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the display controller may be caused to perform a control method comprising the functions of the above-described embodiment. Further, a computer provided in the display controller may be caused to execute a program implementing the control method. Note that the control program is stored e.g. in a computer-readable storage medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2017-023197 filed Feb. 10, 2017, and No. 2018-008122, filed Jan. 22, 2018, which are hereby incorporated by reference herein in their entirety.

What is claimed is:

1. A display control apparatus comprising:
one or more processors; and
a memory including instructions stored thereon that, when executed by the one or more processors, cause the display control apparatus to:
set time intervals at which frames are extracted from a moving image; and
perform control such that a plurality of frames are extracted from the moving image at the time intervals, and the plurality of extracted frames are displayed in a line,
wherein in a case where a moving image includes a first section which was recorded at a first recording frame rate which is the same as a reproduction frame rate, and a second section which was recorded at a second recording frame rate different from the reproduction frame rate, the control is performed such that, from the first section, a plurality of frames are extracted at first frame intervals, and that, from the second section, a plurality of frames are extracted at second frame intervals different from the first frame intervals, whereby the pluralities of frames extracted from the first section and the second section, respectively, are displayed in a line,
wherein the control is performed to display in a line the plurality of frames extracted from the first section at first display position intervals according to the first recording frame rate, and to display in a line the plurality of frames extracted from the second section at second display position intervals according to the second recording frame rate, the second display position intervals being different from the first display position intervals.

2. The display control apparatus according to claim 1, wherein a frame to be extracted is determined, according to a recording time calculated based on the first or second recording frame rate and the time intervals, irrespective of the first section and the second section.

3. The display control apparatus according to claim 2, wherein the instructions, when executed by the one or more processors, further cause the display control apparatus to:
select one frame out of a plurality of displayed frames; and
perform control such that the moving image is reproduced starting from the selected frame, and
wherein the moving image is reproduced at the reproduction frame rate irrespective of the first or second recording frame rate of the selected frame.

4. The display control apparatus according to claim 1, wherein display processing is switched according to a user's operation between first display processing for extracting frames from the first section and the second section at different frame intervals, respectively, and displaying the extracted frames in the line, and second display processing for extracting frames from the first section and the second section at the same frame intervals, and displaying the extracted frames in the line.

5. The display control apparatus according to claim 4, wherein the display control apparatus has a comparison display mode in which frames are extracted at the time intervals, for a plurality of moving images, respectively, and the extracted frames are displayed in the line for each moving image, and
wherein in a case where the comparison display mode is selected, the control is performed such that the first display processing is performed for the plurality of moving images even in a case where the second display processing was selected.

6. The display control apparatus according to claim 1, wherein the control is performed such that a plurality of frame are extracted from the moving image based on a recording time determined based on the first or second recording frame rate, and the plurality of extracted frames are displayed in the line at respective positions according to a reproduction time determined based on the reproduction frame rate.

7. The display control apparatus according to claim 1, wherein the instructions, when executed by the one or more processors, further cause the display control apparatus to:
control such that the moving image is reproduced at same reproduction frame rate irrespective of the first recording frame rate of the first section and the second recording frame rate of the second section, and
wherein the first display position intervals correspond to a reproduction time between the plurality of frames extracted from the first section when the movie image is reproduced at the reproduction frame rate, and the second display position intervals correspond to the reproduction time between the plurality of frames extracted from the second section when the movie image is reproduced at the reproduction frame rate.

8. A method of controlling a display control apparatus, comprising:
setting time intervals at which frames are extracted from a moving image;
performing control such that a plurality of frames are extracted from the moving image at the time intervals, and the plurality of extracted frames are displayed in a line; and
performing, in a case where a moving image includes a first section which was recorded at a first recording frame rate which is the same as a reproduction frame rate, and a second section which was recorded at a second recording frame rate different from the reproduction frame rate, such that, from the first section, a plurality of frames are extracted at first frame intervals, and that, from the second section, a plurality of frames are extracted at second frame intervals different from the first frame intervals, whereby the pluralities of frames extracted from the first section and the second section, respectively, are displayed in a line, wherein the control is performed to display in the line the plurality of frames extracted from the first section at first display position intervals according to the first recording frame rate, and to display in the line the plurality of frames extracted from the second section at second display position intervals according to the second recording frame rate, the second display position intervals being different from the first display position intervals.

9. A non-transitory computer-readable storage medium storing a computer-executable program for executing a method of controlling a display control apparatus, wherein the method comprises:

setting time intervals at which frames are extracted from a moving image;

performing control such that a plurality of frames are extracted from the moving image at the time intervals, and the plurality of extracted frames are displayed in a line; and performing, in a case where a moving image includes a first section which was recorded at a first recording frame rate which is the same as a reproduction frame rate, and a second section which was recorded at a second recording frame rate different from the reproduction frame rate, such that, from the first section, a plurality of frames are extracted at first frame intervals, and that, from the second section, a plurality of frames are extracted at second frame intervals different from the first frame intervals, whereby the pluralities of frames extracted from the first section and the second section, respectively, are displayed in a line, wherein the control is performed to display in the line the plurality of frames extracted from the first section at first display position intervals according to the first recording frame rate, and to display in the line the plurality of frames extracted from the second section at second display position intervals according to the second recording frame rate, the second display position intervals being different from the first display position intervals.

* * * * *